Sept. 16, 1958     J. R. DIETRICH ET AL     2,852,458
APPARATUS FOR CONTROLLING NEUTRONIC REACTORS
Filed Dec. 21, 1955     3 Sheets-Sheet 1

INVENTORS:
Joseph R. Dietrich
Joseph M. Harrer
BY
Roland A. Anderson
Attorney.

Sept. 16, 1958  J. R. DIETRICH ET AL  2,852,458
APPARATUS FOR CONTROLLING NEUTRONIC REACTORS
Filed Dec. 21, 1955  3 Sheets-Sheet 3

INVENTORS:
Joseph R. Dietrich
Joseph M. Harrer
BY
Roland A. Anderson
Attorney

United States Patent Office 2,852,458
Patented Sept. 16, 1958

2,852,458
APPARATUS FOR CONTROLLING NEUTRONIC REACTORS

Joseph R. Dietrich and Joseph M. Harrer, Elmhurst, Ill., assignors to the United States of America as represented by the United States Atomic Energy Commission Application December 21, 1955, Serial No. 554,594

14 Claims. (Cl. 204—193.2)

This invention relates generally to apparatus for controlling the operation of neutronic reactors and more particularly to methods and devices for controlling rapidly the reactivity of an active portion of a reactor.

In neutronic reactors, if a thermal neutron fissionable isotope, such as $U^{233}$, $U^{235}$ or $Pu^{239}$, or mixtures thereof, is subjected to fission by absorption of thermal neutrons, a self-sustaining chain reaction will be established by the neutrons evolved by the fission. In general, such reactors comprise bodies of compositions containing thermal neutron fissionable materials such as, for example, natural uranium disposed in a neutron slowing material which slows down the neutrons to thermal energies. Such a "slowing down" material is termed a neutron moderator. Certain materials such as carbon, beryllium and $D_2O$ are typical moderator materials. The heat which is evolved during a reaction is removed by the passage of a coolant through the reactor or in a heat exchange relationship therewith. Specific details of the theory and essential characteristics of such reactors are set forth in Patent 2,708,656, issued to Fermi and Szilard on May 17, 1955. In any of such reactors, the rate of the reaction is usually controlled by the provision of a control element having high neutron absorbing characteristics, commonly referred to as "capture cross-section," into the active portion or region of the reactor or into an area closely adjacent to said active portion. Materials such as boron or cadmium have high neutron absorbing characteristics and are commonly used in the construction of control elements.

The usual method of controlling the reactivity of a neutronic reactor, as is known to those skilled in the art, is by means of insertion or withdrawal of control elements into or out of the active portion of the reactor. This present means of control has a disadvantage from the operational standpoint, in that its operation results in an altered neutron flux distribution in the active portion of the reactor, and a disadvantage from the mechanical standpoint, in that it requires that a particular spatial clearance be maintained around the neutronic reactor so that the control elements can be withdrawn from the confines of the reactor during operation.

In addition to the above disadvantages, the conventional control rods effect control over reactivity over a limited range and in a negative sense, that is, they are only capable of impeding (not assisting) neutron generation within the active portion of the reactor. The control rods of this type are useless in applications where it is desired to increase reactivity above and beyond the maximum setting, i. e., when they are totally withdrawn out of the confines of the reactor.

It is the main object of the invention to provide an apparatus for uniformly controlling reactivity in a reactor by rotatably manipulatable control elements which possess variable neutron absorbing properties in the active portion of the reactor wherein the manipulation of said elements occurs entirely within the active portion and does not appreciably distort the neutron flux therein.

Another object of the invention is to provide a neutronic reactor having a control device possessing rotatable elements having thereon a tapering thickness of neutron absorbing material to effect a linear variation of neutron absorption with angular displacement of said elements.

Another object of the invention is to provide a control device for controlling reactivity over a wide range in a neutronic reactor, said device being principally housed within the active portion of the reactor during operation thereof and capable of effecting wide and uniform changes in reactivity by means of replaceable elements made of materials having different neutron capture cross-sections.

A further object of the invention is to provide a neutronic reactor having a control device possessing stationary and rotatable elements having means thereon for mounting both neutron absorbing and fissionable fuel materials for extending the range of control of said device.

The foregoing, and other objects and advantages of the invention, will become apparent from a consideration of the specification in conjunction with an accompanying drawing, wherein.

According to the teachings of the invention, there is provided a method and a device for controlling neutron reactivity in the active portion of a neutronic reactor. The method comprises the steps of positioning portions of a control device possessing variable thicknesses of neutron absorbing material throughout the reactor so that they effect uniform absorption of neutrons within the active portion of said reactor. The control device comprises a pair of elements having sections of neutron absorbing and neutron transparent materials. The elements are rotatably and translatably movable relative to each other to vary the neutron absorbing volume therebetween, wherein the movements of the elements are confined entirely within the active portion of the reactor. The position of the neutron absorbing sections of the elements with respect to each other determines the amount of mutual shadowing produced therebetween. The rotational movement of a single device affects the neutron absorption not only of the device alone but also exerts or produces a shadowing effect in the neutron flux upon other identical devices dispersed throughout the active portion of the reactor. The control of the device may be extended by utilizing additional sections made of thermal neutron fissionable fuel, which fuel sections may be substituted for the neutral transparent sections. The control device is cooled to dissipate heat generated by the fuel elements.

As to the broad aspects of neutronic reactivity control achieved by shadow control in the flux, reference may be had to the copending application owned by the common assignee, namely S. N. 459,219, filed on September 29, 1954, by S. Untermyer et al.

Figure 1:
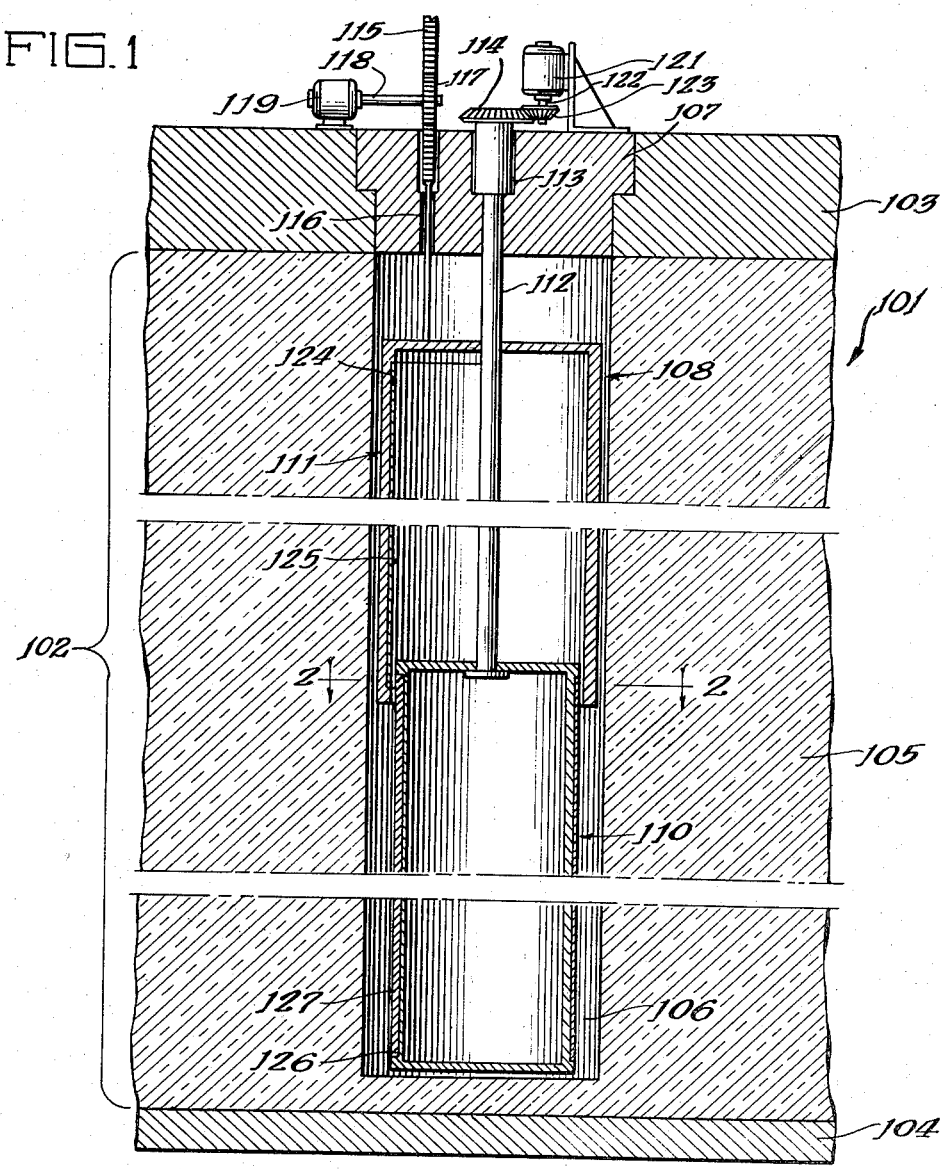
Fig. 1 is a longitudinal cross-sectional view of one embodiment of the invention occupying a position within a fragmentary portion of a reactor.

Referring to Fig. 1, a portion of reactor 101 is shown comprising an active portion 102 enclosed by the shields 103 and 104. The active portion 102 contains fissionable fuel embedded in a lattice 105; however, in this figure, only a small fragment of the lattice 105 is shown with only one aperture 106 for admitting a single control device. The reactor 101 contains a plurality of such apertures for admitting additional control devices. The aperture 106 corresponds to the aperture 29a, Fig. 7, shown in the Fermi et al. patent referred to previously. The end of the aperture 106 is closed off by a plug 107. The shields 103 and 104, as well as the plug 107, are made of materials which are good radiation barriers in order to prevent the radiation generated within the active portion 102 of the reactor 101 from escaping out of the reactor into the atmosphere where it may possibly harm operating personnel and damage equipment. A control device 108 comprises a pair of tubular members, namely an inner cylinder 110 and an outer cylinder 111, both of said cylinders coaxially disposed to each other and adapted to cooperate with each other so that the outer cylinder 111 encompasses the inner cylinder 110. The inner cylinder 110 is supported by a shaft 112 which extends through an opening 113 in the plug 107 and terminates in a bevel gear 114 (the shaft 112 also extending through an opening in the outer cylinder 111). The outer cylinder 111 is adjustably supported by a rack 115 which extends through an opening 116 in the plug 107. The outer cylinder 111 is adapted to be translated with respect to the inner cylinder 110 by means of the rack 115 which engages a pinion 117 mounted on a motor shaft 118 of a motor 119. The inner cylinder 110 can be rotatably moved with respect to the outer cylinder 111 by application of torque transmitted from a motor 121 through a shaft 122 and a bevel gear 123 to the bevel gear 114. The cylinders 110 and 111 are made of any material which has a small capture cross-section for thermal neutrons and is therefore substantially transparent to neutron penetration, for example stainless steel. A recess 24 extends peripherally, for a little more than 180 degrees, in the inner wall of the outer cylinder 111. The recess 124 is filled with a material 125 having a large capture cross-section for thermal neutrons. Similarly, the inner cylinder 110 contains a recess 126 in its wall so that the recess is in the outer periphery of said inner cylinder and subtends 180 degrees of said cylinder. The recess 126 is also filled with suitable neutron absorbing material 127. The neutron absorbing materials 125 and 127 may comprise materials which have a neutron cross-section of at least 100 barns, for example boron, lithium, or thorium, or any combination thereof. The absorber materials 125 and 127 are embedded in the recesses of the respective cylinders so that only a minimum of clearance is maintained between the two coacting cylinders. The neutron absorbing materials 125 and 127 may be in the form of a coating or a sheet which is fastened within the recesses of the respective cylinders. The thickness of the absorber materials 125 and 127 is determined by nuclear requirements of the control device effectiveness and reactor design. The thickness of the absorber materials 125 and 127 may be uniform or may be tapered so as to present different control characteristics versus rotational movement. The portions or sectors of the cylinders 110 and 111 that contain the neutron absorbing materials may be termed absorber zones and the portions which do not impede the passage of neutrons may be termed neutron transparent or neutral zones.

Figure 2:
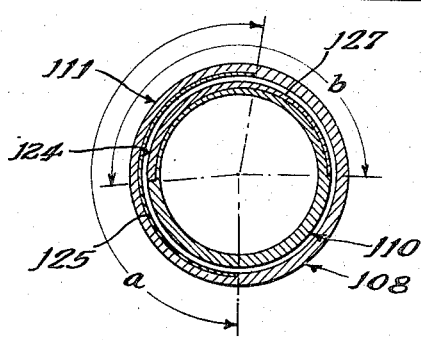
Fig. 2 is a transverse cross-sectional view taken along the line 2—2 of Fig. 1.

The portions of the respective cylinders which are covered by the neutron absorbing materials 125 and 127 can be more clearly seen in Fig. 2. The angular dimension "a" represents the number of degrees over which the absorber material 125 extends over the inner wall of the outer cylinder 111 and the dimension "b" represents the number of degrees over which the absorber material 127 extends over the outer face of the inner cylinder 110. In principle, these dimensions may be 180 degrees plus or minus several degrees.

To change the amount of neutron absorber effectiveness in the reactor 101, the inner cylinder 110 may be rotated or translated or both movements may be utilized. In the fully extended position as shown in Fig. 1, the control device 108 presents a maximum area for neutron absorption but from the control standpoint presents the minimum in control because rotation of the inner cylinder 110 does not change the effective area presented to incident neutrons by the neutron absorber materials 125 and 127. If desired, the outer cylinder 111 may be rotated instead of the inner cylinder 110 depending on the particular application. If the inner cylinder 110 is first translated so it occupies a position within the outer cylinder 111 and is then rotated by applying the necessary torque so that the neutron absorber material 127 is overlapped by the absorber material 125, i. e., the center of the dimension "b" coincides with the center of the dimension "a," the control device 108 is least effective or least absorbing thereby presenting a minimum amount of control over neutron generation in the active portion 102. When the inner cylinder 110 is rotated so that the absorber material 127 occupies a position which is diametrically opposite to the position occupied by the absorber material 125, the control device is most effective and offers the greatest amount of neutron absorption. The relative rotative movement of the cylinders between these limiting positions will result in variable neutron absorption in the active portion 102 thus offering a means for controlling nuclear reactivity therein. If the cylinders 110 and 111 are translated with respect to each other, an additional control over the operating range is achieved by distributing the absorber materials 125 and 127 along the length of the aperture 106. Thus, if the outer cylinder 111 is positioned along the length of the inner cylinder 110 so that the absorber material 125 superimposes or overlaps the absorber material 127, the effectiveness of the control device 108 is changed from a maximum when the outer absorber material 125 covers the inner absorber material 127 to a minimum when the outer cylinder 111 is completely removed so as not to encompass the inner cylinder 110.

Since one element of the control device rotates relative to another element, the variation of neutron absorption with angular motion is not uniform since it varies with the cosine of the angle of rotation. If it is desired for any reason to obtain a linear variation in control effectiveness with the rotation of the inner cylinder 110, the thickness of the absorber material 127 may be varied, as shown in Fig. 2. The control cylinders 110 and 111 may be of any length which is desirable for a particular nuclear reactor. The variation in thickness of the absorber, depending on individual reactor design and the type of absorber used, may be readily determined by those skilled in the nuclear art.

Figure 3:
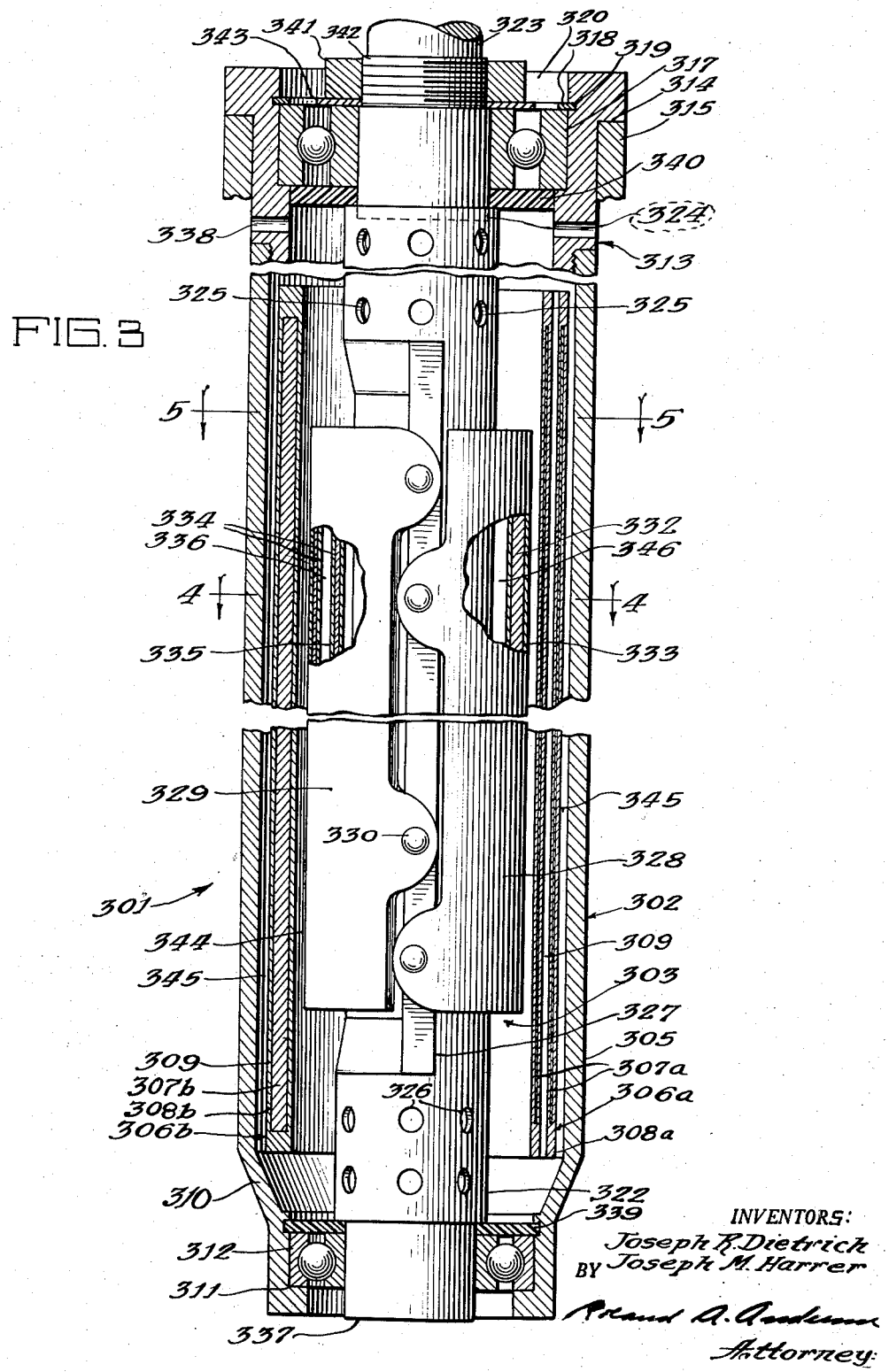
Fig. 3 shows a longitudinal cross-sectional view of another embodiment of the invention.
Figure 4:
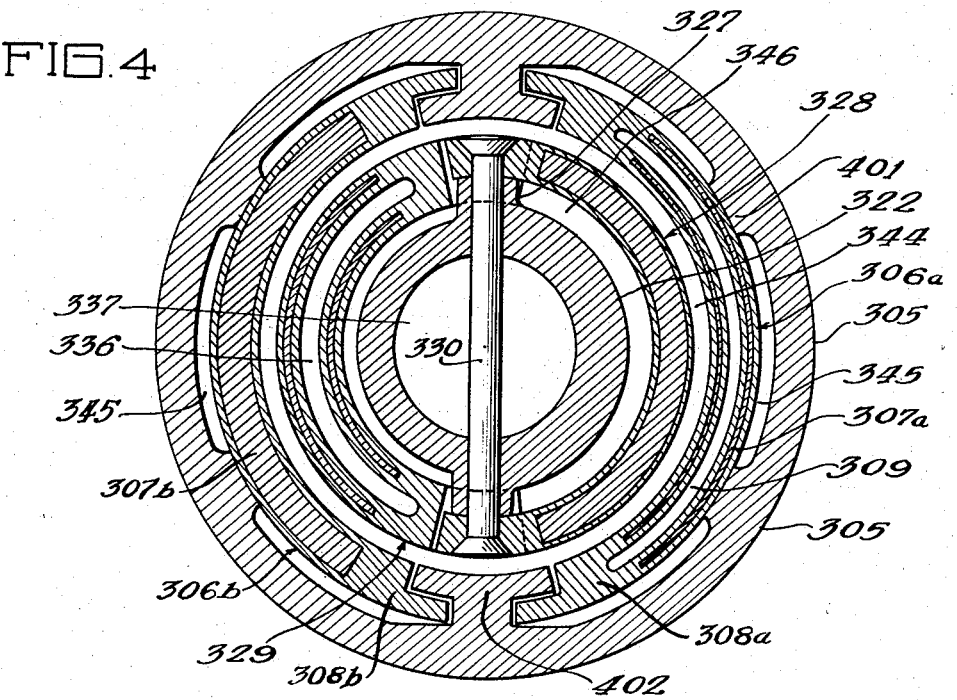
Fig. 4 is a transverse cross-sectional view taken along the line 4—4 of Fig. 3.
Figure 5:
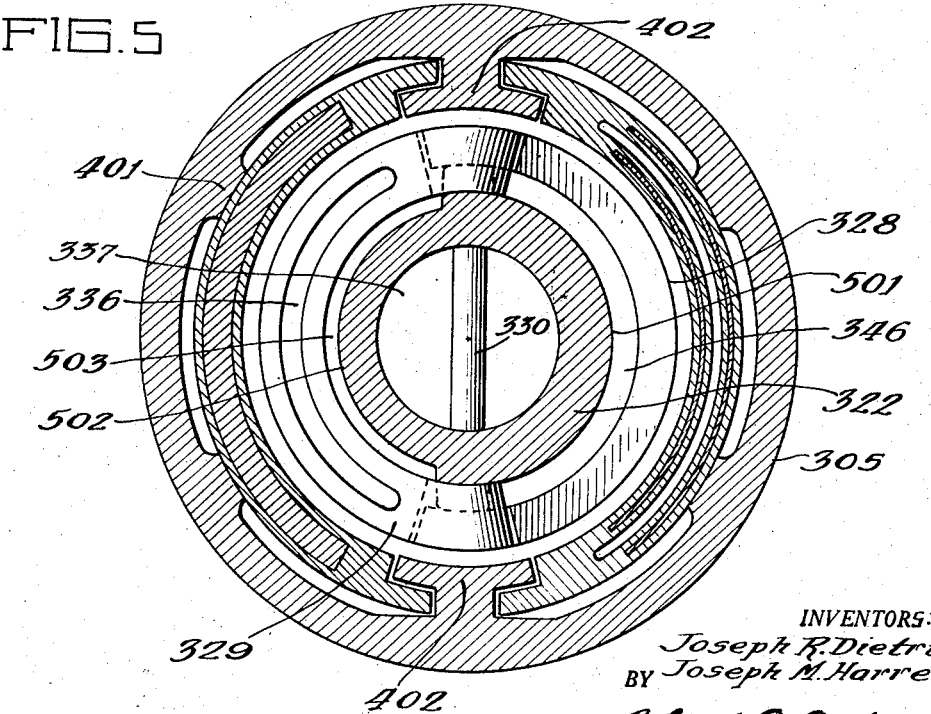
Fig. 5 is a transverse cross-sectional view taken along the line 5—5 of Fig. 3.

The control device 108, as shown in Figs. 1 and 2, represents the basic concepts of the invention. The preferred embodiment of the invention is shown in Figs. 3, 4 and 5. A control device 301 comprises a stationary member 302 and a movable member 303. The stationary member 302 comprises a cylindrical casing 305 having contained therein a fuel element 306a and an absorber element 306b. The fuel element 306a comprises a thermal neutron fissionable fuel material 307a, such as uranium-235, encased by a base material 308a. The absorber element 306b has neutron absorbing material 307b, such as boron or cadmium, encased by a base material 308b. The fuel element 306a possesses two layers of fuel 307a sealed in the base material 308a having a slot 309 between said encased layers of fuel to admit a cooling agent. The means for attaching the fuel element 306a and the absorber element 306b to the casing 305 will be described later in reference to Figs. 4 and 5. The casing 305 has a tapered extremity 310 at one end thereof and forms a seat 311 for seating a ball bearing assembly 312. The other extremity of the casing 305 is attached by suitable means, such as threading or welding, to a bearing housing 313. The bearing housing 313 has a shoulder 314 adapted to abut a supporting structure 315. The supporting structure 315 is a part of a reactor in which the control device 301 may be used for controlling neutron reactivity in the active portion of said reactor, for example, the face of the reactor having the opening 29a as shown in Fig. 7 in the Fermi et al. patent. The bearing housing 313 contains a bearing assembly 317 which is securely mounted therein by a C-ring 318 engaging a groove 319 in a cylindrical opening 320. The casing 305, as well as the base materials 308a and 308b, are made of materials which do not impede substantially the passage of neutrons therethrough, for example stainless steel.

The movable member 303 comprises a rotor 322 extending concentrically through the bore of the stationary member 302, the rotor 322 having one end in the bearing assembly 312 and the other end attached to a shaft 323. The shaft 323 is solid and engages with the rotor 322 at a junction 324 (hidden line) by any one of the well-known manners such as press-fitting or soldering. The shaft 323 serves to seal off, at one end, the interior of the hollow rotor 322. The rotor 322 has a plurality of apertures 325 and 326 whereby the interior of the rotor communicates with the interior of the stationary member 302. The rotor 322 is machined down from a larger diameter so that a ridge 327 extends between the apertures 325 and 326. A similar ridge (not shown) exists on the rotor 322 diametrically opposite to the ridge 327. The ridges 327 serve to support an absorber element 328 and a fuel element 329 by means of rivets 330. The absorber element 328 comprises a neutron absorbing material 332 encased by neutron transparent material 333. The fuel element 329 comprises a fuel 334 encased by base material 335. The fuel 334 is the same kind of thermal neutron-fissionable material as that contained in the fuel element 306a. The fragmentary views of the absorber element 328 and the fuel element 329 disclose the encasement of the inner materials, such as the absorber material 332 and the fuel 334, by outer materials 333 and 335, respectively. The fuel element 329 possesses a slot 336 between the encased layers of fuel 334 for admitting a coolant therebetween.

The control device 301 is adapted to be cooled by a suitable cooling agent, such as light or heavy water, to dissipate the heat generated by the fuel contained in said control device. For example, a cooling agent may be admitted under pressure through an opening 337 in the rotor 322 and passed through the interior of the control device 301 until it is finally forced out through a plurality of apertures 338. In order to keep the cooling agent from escaping through the bearing assemblies 312 and 317, suitable means, such as seals 339 and 340, are provided. The pressure exerted by the rotor 322 upon the seals 339 and 340 may be varied to some extent by adjusting a nut 341 which engages a threaded portion 342 of the shaft 323. A washer 343 inserted between the nut 341 and the bearing 317 prevents interference therebetween. A portion of the cooling agent which is admitted through the opening 337 leaves the interior of the rotor 322 through the apertures 326 and flows between the various components comprising the control device 301. For example, some of the cooling agent will traverse in the space 344 existing between the fuel element 329 and the absorber element 306b; some will pass through the slot 309 between the encased fuel layers 307 in the fuel element 306a; some will traverse through spaces 345 existing between the casing 305, the fuel element 306a and the absorber element 306b; some will pass through the slot 336 between the layers of the fuel 334; some will flow through the opening 346 between the absorber element 328 and the rotor 322; and some flow will occur in other spaces and cavities existing between the various components comprising the control device 301. The rotor 322 is made of material which does not impede the passage of neutrons therethrough, such as stainless steel.

The various openings and cavities existing between the components comprising the control device 301 are clearly illustrated in Fig. 4 wherein a cross-section of the device shown in Fig. 3, taken along the line 4—4, is shown. The casing 305 has a series of protuberances 401 extending longitudinally along its entire length to support the elements 306a and 306b and to enable the coolant to pass in the spaces 345 existing between said protuberances. The casing 305 also possesses a pair of T-shaped lugs 402, located diametrically opposite to each other, for engaging the arcuate elements 306a and 306b and supporting said elements concentrically in relation to the casing 305. The absorber element 328 is mounted on the rotor 322 on top of the ridges 327 by the rivets 330. The fuel element 329 is similarly mounted on the rotor 322. In the position of the rotor 322 shown in Fig. 4, the absorber element 328 is adjacent to the fuel element 306a and the fuel element 329 is adjacent to the absorber element 306b. In this position, the control device 301 exerts maximum control over nuclear reactivity in the active portion of the reactor because (1) the absorber elements occupy widely dispersed positions creating a large neutron absorbing volume, and (2) the absorber elements are in close proximity to the fuel elements and are thereby more effective to absorb the neutrons released in said fuel elements. If the absorber element 328 occupies a position adjacent to the absorber element 306b, the control device 301 offers the least control over reactivity occurring in the space adjacent thereto.

The details of attachment of the fuel element 329 to the rotor 322 are indicated in Fig. 5. The inner curvature of the semi-cylindrical fuel element 329 corresponds to the outer curvature of the rotor 322. As shown, the rotor 322 possesses two outer diameters 501 and 502, the object of this configuration being to establish a spacing 346 between the rotor 322 and the absorber element 328 and to establish a spacing 503 between the rotor 322 and the fuel element 329.

Although the control device 301 may be used in a great number of neutronic reactors, it may be used specifically in a heavy water neutronic reactor described in the copending application by S. Untermyer, S. N. 500,706, filed on April 11, 1955. The control element 301, described herein, may be substituted for the control element 286, shown in Fig. 25, of the Untermyer patent application. The control device 301 may be utilized in the reactor described in the above-mentioned copending application by inserting the control device 301 into the cavity of the tube 126 shown in Fig. 3 of said Untermyer application so that it extends throughout the active portion of the reactor described therein.

Control over reactivity in the active portion of a reactor is achieved by inserting a plurality of the control devices 301 into control rod openings in the reactor and then rotating the movable members in the devices, either individually or in groups, to produce mutual flux shadowing between the elements of each device. Since each of the devices 301 extends through the entire length of the reactor, the absorption of neutrons therein is axially uniform. Thus reactivity is increased by positioning a fuel element adjacent to another fuel element and decreased by positioning one of the absorber elements in opposition to the other absorber element.

While there has been described what is at present considered to be the preferred embodiment of the invention, it will be understood that various modifications may be made therein and it is intended in the appended claims to cover all such modifications as found within the true spirit and scope of the invention.

What is claimed is:

1. In a neutronic reactor having an active portion comprising a thermal neutron fissionable material and adapted to release neutrons therefrom, and apparatus for controlling the release of neutrons in said active portion, the improvement wherein said apparatus comprises coaxially disposed members each having circumferential sections of material having different neutron absorbing characteristics, and means for moving the members rotatably and translatably relative to each other within said active portion to vary the neutron flux therein, whereby the angular and translational movements of any member change the neutron flux shadowing effect of said member upon the other member.

2. In a neutronic reactor including an active portion comprising thermal neutron fissionable material and apparatus for controlling the release of neutrons from said material, the improvement wherein the apparatus comprises a pair of tubular members coaxially disposed with respect to each other to form an integral group, each of said members having the periphery thereof subdivided into sections constructed of different materials, the materials in the sections having neutron absorbing and substantially non-absorbing characteristics, and means for rotating said members of each group on a common axis relative to each other to vary the neutron flux passing through the group.

3. In a neutronic reactor system including a neutronic reactor having an active portion comprising thermal neutron fissionable material and groups of control members, said members being partially constructed of neutron absorbing material and extending through the active portion to control the release of neutrons from the fissionable material, the improvement wherein each group comprises a pair of tubular members coupled to each other in a close concentric relationship, each of said members comprising peripheral sections having different neutron absorbing characteristics, and means for rotating said members relative to each other to obtain a variable superposition of neutron absorbing sections over neutron transparent sections to effect a variable area to intercept the flux in the active portion, whereby said control movement is confined within the active portion of the reactor.

4. In a neutronic reactor system including a neutronic reactor having an active region and thermal neutron fissionable material therein, and means containing neutron absorbing material for controlling neutron flux in the active portion, the improved control means comprising at least two tubular members cooperatively coupled together and coaxially disposed in a close spatial relationship, the members being constructed of substantially neutron transparent material and having thereon peripheral sections containing neutron absorbing material, and means for moving rotatably said members relative to each other to obtain varying degrees of mutual shadowing upon each other in the neutron flux whereby the degree of shadowing is dependent upon the angular displacement of the neutron absorbing sections of one member with respect to the neutron absorbing sections of the other member.

5. In a neutronic reactor having an active portion comprising thermal neutron fissionable material and means for controlling the amount of neutrons released from said material, the improved construction of the control means wherein there are provided at least two semi-cylindrical plates of thermal neutron absorbing material extending through the active portion, said plates being coaxially mounted and adapted to be rotated in relation to each other on a common axis, and means for rotatably moving said plates with respect to each other to vary the amount of neutron interception and mutual shadowing of the plates in the neutron flux, whereby each of said plates controls to a certain extent the amount of neutrons incident on the other plates.

6. A neutronic reactor system including a neutronic reactor having a reactive zone comprising thermal neutron fissionable material and adapted to release neutrons from the material, and means for controlling the neutron release in the zone, comprising, a group of at least two control members coaxially coupled together and adapted to move rotatably relative to each other on a common axis, each of said members being constructed of peripheral sectors having neutron absorbing and substantially non-absorbing characteristics, and means for rotatably moving said members within said zone in relation to each other to variably expose the neutron absorbing sectors to the neutron flux existing in the active zone, whereby the amount of neutrons absorbed by the group is dependent upon the angular displacement between the coacting members.

7. The neutronic reactor system claimed in claim 6, wherein some of the control members have a tapered thickness of neutron absorbing material distributed along the width of the sectors, the thickness of the neutron absorbing material increasing peripherally in said members.

8. The neutronic reactor system as claimed in claim 6, wherein each control member comprises a cylinder having at least one neutron-absorber peripheral sector and one substantially neutron transparent peripheral sector, whereby maximum control is achieved when the neutron absorber sector of one member is rotated diametrically opposite to the neutron absorber sector of the other member.

9. The system of claim 8 wherein the absorber sector comprises lithium.

10. The system of claim 8 wherein the absorber sector comprises thorium.

11. The system of claim 8 wherein the absorber sector comprises boron.

12. The system of claim 8 wherein the absorber sector comprises a material having a capture cross-section of at least 100 barns.

13. The neutronic reactor system as claimed in claim 6 wherein each control member comprises at least one peripheral section of neutron absorbing material and one section of neutron fissionable material, whereby positioning of the neutron absorbing section of one member in opposition to the neutron absorbing section in the other member will increase neutron absorption and the positioning of the neutron fissionable section adjacent to the other neutron fissionable section will increase reactivity.

14. The neutronic reactor system as claimed in claim 13, wherein one of said control members comprises a shaft, an arcuate element of neutron absorbing material, an arcuate element of neutron fissionable material, and means for attaching said elements in opposition to each other on the shaft, said control member being in close concentric relationship to the other member and adapted to be rotated therewithin, the neutron generation in the active zone being dependent on the proximity of the neutron absorbing section of one member to the neutron fissionable section of the other member, said shaft cooperating with the elements to form passages therebetween for the admission of coolant therethrough.

No references cited.